United States Patent [15] 3,665,902
Bloomfield [45] May 30, 1972

[54] STRATFIELD-CHARGE ENGINE AND FUEL IGNITION-INJECTION PLUG THEREFOR

[72] Inventor: John J. Bloomfield, 222 South Sunset Canyon Dr., Burbank, Calif. 91501

[22] Filed: Dec. 24, 1969

[21] Appl. No.: 887,941

[52] U.S. Cl. .................... 123/32 ST, 123/32 SJ, 123/143 R
[51] Int. Cl. ............................................. F02p 13/02
[58] Field of Search .............. 123/32, 32 ST, 32 SP, 32 SJ, 123/139, 139.9, 143, 143 A, 169 EL

[56] References Cited

UNITED STATES PATENTS

| | | | |
|---|---|---|---|
| 2,255,203 | 9/1941 | Wiegand | 123/32 SJ |
| 2,718,883 | 9/1955 | Taylor | 123/32 |
| 2,869,527 | 1/1959 | Groves | 123/139.18 |
| 2,960,973 | 11/1960 | Davis | 123/32 E |
| 2,963,014 | 12/1960 | Voelcker | 123/32 SJ |
| 3,081,758 | 3/1963 | May | 123/139.9 |
| 3,302,658 | 2/1967 | Frees | 220/44 |
| 3,395,683 | 8/1968 | Jackson | 123/139.18 |
| 3,517,654 | 6/1970 | Sarto et al. | 123/136 |

Primary Examiner—Laurence M. Goodridge
Attorney—Robert E. Geauque

[57] ABSTRACT

A stratified-charge spark ignition engine. The engine has cylinder intake ports which effectively open directly to atmosphere, such that unheated and unthrottled fuel free air is drawn into the cylinders during intake, and a novel throttle controlled compression actuated fuel injection and ignition system which injects a metered quantity of atomized fuel directly into the spark region of each cylinder immediately prior to firing to provide within the region at the instant of firing a highly combustible stratified fuel charge. The fuel injection-ignition system embodies novel fuel injection-ignition units for the cylinders which serve the dual function of throttle controlled, compression actuated fuel metering pumps for injecting fuel into the cylinder spark regions and spark plugs for igniting the fuel. In their preferred configuration, these injection-ignition units resemble and are designed to replace the spark plugs of a conventional gasoline engine to permit conversion of the latter to a stratified-charge engine with minimum modification and cost.

10 Claims, 6 Drawing Figures

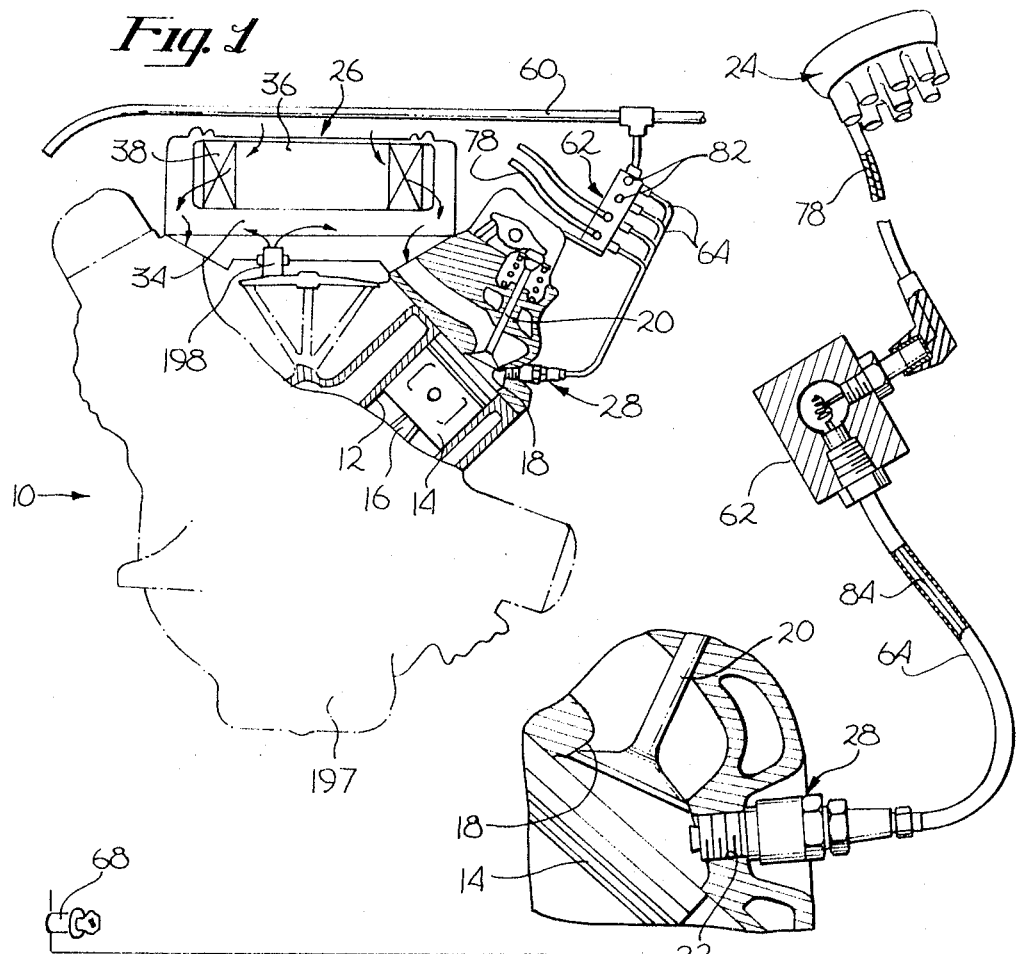
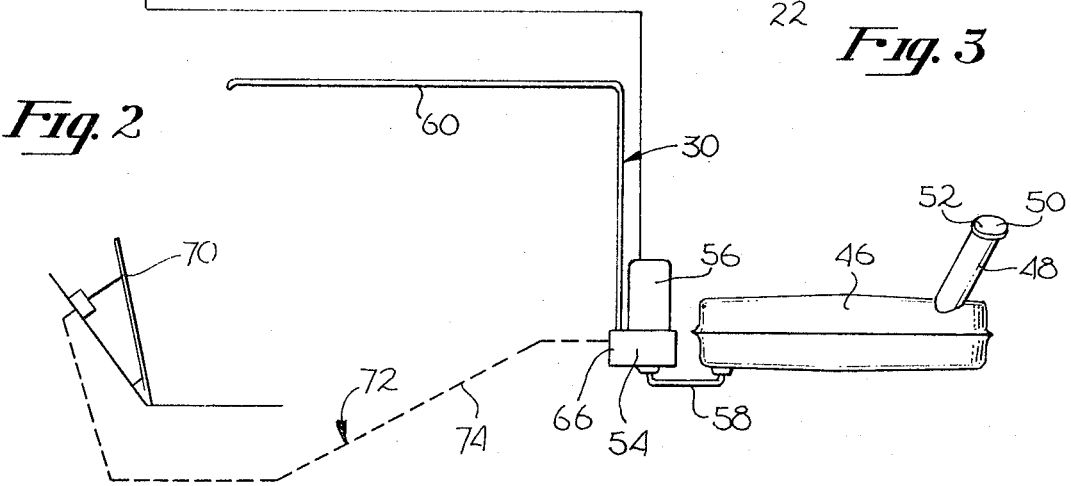
JOHN J. BLOOMFIELD
INVENTOR.
BY R.S. Geangue
ATTORNEY

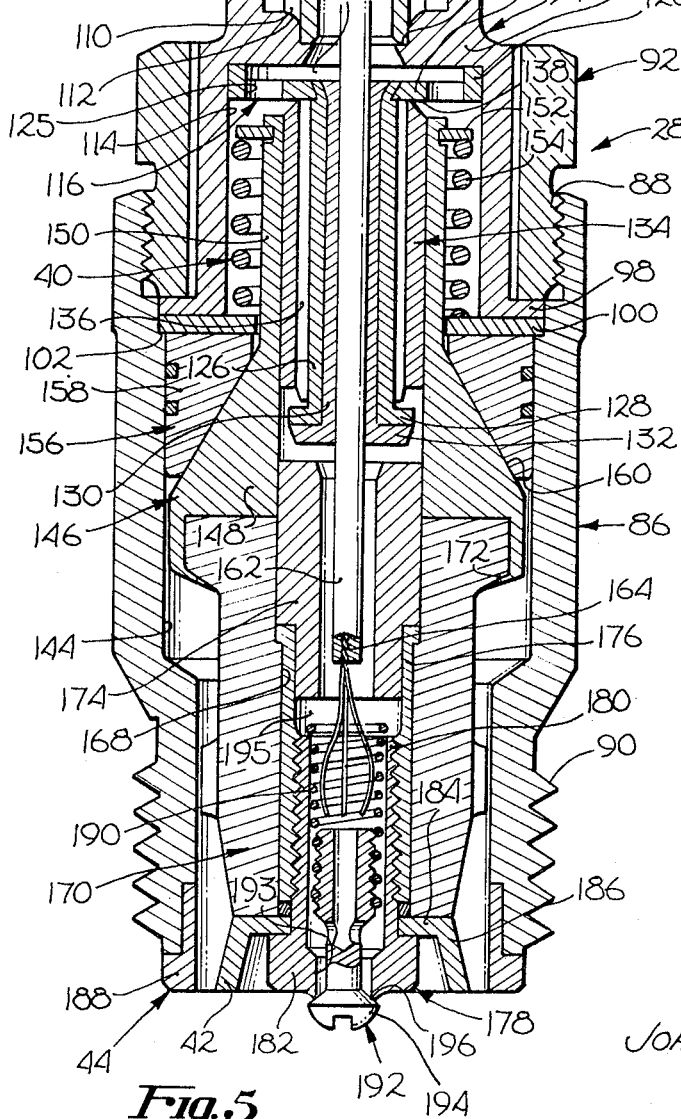
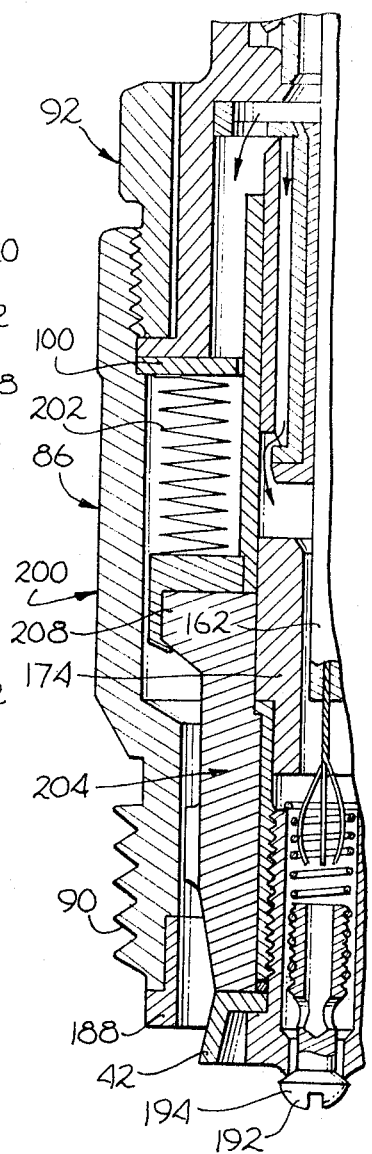
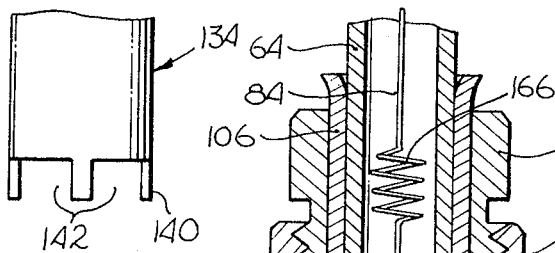
Fig. 4
Fig. 5
Fig. 6
JOHN J. BLOOMFIELD
INVENTOR.
BY R. E. Geangue
ATTORNEY 3,665,902

STRATFIELD-CHARGE ENGINE AND FUEL IGNITION-INJECTION PLUG THEREFOR

BACKGROUND OF THE INVENTION

1. Field of the Invention

This invention relates generally to the field of internal combustion engines and more particularly to an improved, so-called stratified-charge spark ignition engine.

2. Prior Art

The vast majority of present-day automotive passenger cars are powered by carbureted spark ignition Otto-cycle engines, commonly referred to as gasoline engines. This widespread use of the spark ignition engine for passenger car use has occurred in spite of the many shortcomings of the engine in its present form. It is well known, for example, that the compression ignition or diesel engine presents certain advantages over the spark ignition engine, notably greater fuel economy, reduced exhaust contaminant emission, and superior part throttle performance. However, the diesel engine has not found widespread acceptance for passenger car use because of its relatively rough operation and its comparatively massive size and weight.

The disadvantages of the existing carbureted spark ignition or gasoline powered engines, hereinafter referred to simply as gasoline engines, are well known to those versed in the art and thus need not be treated in detail. However, some description on this point is deemed advisable in order to provide a better understanding of the present invention and a better appreciation of its advantages and benefits. Perhaps two of the most undesirable characteristics of gasoline engines are their relatively low efficiency and relatively high exhaust contaminant emission. These disadvantages result from a combination of factors, four of which the present invention proposes to alleviate and thereby improve engine efficiency and reduce exhaust pollution. The four factors referred to may be stated broadly as inefficient utilization of the fuel, inefficient control of engine power output, loss of fuel vapors from carburetors and fuel tanks, and, finally, ineffective and even harmful disposal of crankcase blow-by gases.

In this regard, it is well known that in a conventional gasoline engine, the induction air and fuel are mixed within a carburetor to provide a combustible air-fuel mixture which passes from the carburetor, through the engine intake manifold, to the engine cylinder intake ports. Each intake port is opened during the intake stroke of its respective cylinder piston to admit the mixture to the cylinder. During the following compression stroke, the mixture is compressed and ignited to produce a power stroke. Engine power output is controlled by a throttle valve within the carburetor air passage.

Several adverse actions occur in the overall energy conversion process between initial air flow through the carburetor and final combustion of the air-fuel mixture in the engine cylinders which lower engine efficiency and/or promote exhaust pollution. The first of these actions is the throttling action of the throttle valve to control the engine power output. This throttling action throttles the air-fuel mixture during the suction strokes of the cylinders and being an irreversible process, it introduces a substantial loss of efficiency.

A second adverse action occurs within the intake manifold which results in the delivery of an excessively rich mixture to some cylinders and an excessively lean mixture to other cylinders. As discussed below, this promotes improper or incomplete burning of the fuel in the cylinders with resultant failure to utilize all of the available energy in the fuel and/or increases the exhaust pollution. The problem is particularly acute when starting an engine and during sudden changes in throttle valve setting or engine speed. In an attempt to alleviate this difficulty, heat from the exhaust is diverted to raise the temperature of the air-fuel mixture as it enters the intake manifold. This is bad on two counts. One, it reduces the density of the air-fuel mixture and cuts down the potential power output in direct proportion to that reduction. Two, it narrows the margin between proper combustion and the intervention of pre-ignition or detonation. Of the latter two, pre-ignition is the more destructive, but unchecked detonation can quickly degenerate into the former.

Proceeding further in the energy conversion process, we come to the actual combustion of the fuel-air mixture within the cylinders which introduces additional energy loss and exhaust pollution. In the first place, at the instant of firing within a cylinder, the fuel and air exist in the form of a relatively homogeneous air-fuel mixture throughout the then reduced space between the piston and cylinder head. In order to attain complete combustion of the fuel in the mixture, the burning process following firing must proceed throughout the entire fuel-air charge in the cylinder space. Unfortunately, a chemically correct fuel-air mixture burns relatively slowly, as compared to a fuel rich maximum power mixture, for example. This factor coupled with the extremely short burning time available for combustion, results in incomplete combustion of the fuel over a large portion of the engine operating range. Incomplete combustion, in turn, results in incomplete release of the available fuel energy and hence loss of efficiency and in increased exhaust pollution. The problem is aggravated by the above discussed propensity of the engine intake manifold to deliver an excessively lean mixture to some cylinders and an excessively rich mixture to other cylinders.

The originator of the Otto-cycle recognized at least some of the above deficiencies of the Otto-cycle or carbureted spark ignition engine. In an effort to cure the deficiencies he recognized, as well as those which he thought might plague his engine in the future, Otto conceived the so-called stratified charge concept. This concept has been investigated and embodied in many experimental engines over the some 100 years since its inception. However, as yet no practical means of utilizing the concept, at least in economically feasible passenger car engines, has been available, in spite of the fact that experts in the field have always recognized the validity of the concept and its advantages. Simply stated, the stratified-charge concept involves two basic changes in the conventional carbureted spark ignition engine. The first is the elimination of the carburetor and intake manifold such that the engine cylinders effectively receive unheated and unthrottled fuel free air directly from the atmosphere during each intake stroke. Secondly, a metered charge of atomized fuel is injected directly into the spark region of each cylinder immediately prior to firing to provide within the region at the instant of firing a concentrated or stratified fuel rich charge.

The stratified-charge engine concept presents several theoretical advantages. One of these advantages, for example, resides in the fact that initial combustion of the stratified charge is rapid and certain and releases so much energy as to insure that the fuel within the leaner regions of the cylinder, which is normally unignitable, will also be completely consumed. By utilizing this stratified-charge technique, then, quantities of fuel which, when homogeneously mixed with air would be absolutely non-reactive, may be completely consumed with a resultant reduction in exhaust pollution and a resultant increase in thermodynamic efficiency. Moreover, the maximum possible weight of air is inducted into the engine cylinders at all engine loads and speeds. Under these conditions, the output of the engine is dependent on one variable only, namely, the weight of the fuel injected into the cylinders. As a consequence, engine output may be controlled by simply regulating the weight of fuel injected into the cylinders, rather than by throttling the air-fuel mixture, as in the existing automobile engines. The energy loss represented by this throttling process is thereby eliminated and engine efficiency is correspondingly improved. At low and intermediate engine output, there will be a considerable excess of air within the cylinders. This is highly desirable for three reasons. First, the fuel injected into the cylinders will be completely consumed, thus eliminating the production of carbon monoxide and unburned hydrocarbons which constitute two major sources of exhaust pollution. Secondly, the maximum and the mean temperature of the combustion cycle will be considerably reduced. This results in lower heat losses and in a reduction of the dissociation of the products of combustion with proportionately improved thermodynamic efficiency. Finally, with lower combustion temperatures, the formation of nitrogen oxides, which constitutes another major source of exhaust pollution, is inhibited if not virtually eliminated. The stratified-charge concept has three additional inherent characteristics which tend to further improve engine efficiency and reduce exhaust pollution, even at maximum power output. First, heating of the induction air is minimized with the result that a maximum charge of air is drawn into the cylinders during each intake stroke. Secondly, no fuel is present in the induction air to reduce, by the partial vapor pressures of the fuel components, the volume of air drawn into the cylinders. Third, unlike the conventional internal combustion engine which utilizes a homogeneously premixed charge of air and fuel, the stratified-charge concept or engine does not require an excess of fuel for maximum power output because of the presence of the stratified fuel rich charge within the spark regions of the cylinders at the time of firing.

It is evident at this point that the stratified charge engine is relatively simple in principle and involves the induction of a full charge of essentially pure atmospheric air into the cylinders during intake and subsequent compression of this air charge during the compression stroke. Just prior to discharge of the spark in each cylinder, near the end of its compression stroke, a reasonably well atomized spray of fuel is injected directly into the spark region of the cylinder to produce a stratum or cloud of fuel within this region. The engine is spoken of as a stratified-charge engine because instead of a homogeneous air-fuel mixture, the charge is stratified. The fuel injection is timed so that before the fuel stratum has a chance to dissipate, the spark is fired to initiate combustion. The sudden local rise in pressure and temperature resulting from burning of the fuel charge disseminates all unburned particles of fuel into regions of the cylinder wherein an excess of air will insure complete combustion of the remainder of the charge. The stratified charge engine is thus relatively simple and, as noted earlier, its advantages have been known for over a hundred years. In spite of these factors, however, no practical stratified charge engine has yet been devised.

SUMMARY OF THE INVENTION

The present invention provides such a practical stratified-charge engine. The engine is characterized by its ability to utilize the stratified-charge concept to its maximum advantage, by its simplicity of construction and relatively low cost, and by its unique adaptation to existing automobile engines with minimum modification of such engines. Stated briefly, the stratified-charge engine of the invention is characterized by cylinder intake ports which effectively open directly to atmosphere, such that unheated and unthrottled fuel free air is drawn into the cylinders directly from atmosphere during intake, and by a novel throttle controlled, cylinder compression actuated fuel injection and ignition system which injects a metered quantity of atomized fuel directly into the spark region of each cylinder immediately prior to firing to provide within this region at the instant of firing a highly combustible fuel rich stratum, or fuel rich charge. According to one unique feature of the invention, the pressure or compression within each cylinder during its compression stroke is utilized to induce fuel injection into the cylinder in response to the cylinder pressure attaining a predetermined pressure level which is that existing in the cylinder just prior to firing. This method of fuel injection presents two distinct advantages, namely, maximum simplicity and minimum cost of the fuel injection system, and automatic timing of fuel injection to occur at the optimum time prior to firing without the need of external timing gear for this purpose.

According to another unique feature of the invention, the fuel injection and ignition system embodies novel combination fuel injection and ignition units for the individual cylinders. These injection-ignition units serve the dual function of throttle controlled, compression actuated fuel metering pumps for injecting a metered fuel charge into the cylinder spark regions and spark plugs for igniting the charge. In their preferred configuration, the fuel injection-ignition units resemble and are designed to replace the spark plugs of the conventional gasoline engine to permit conversion of the latter to a stratified-charge engine with minimum modification and cost.

The embodiment of the invention which has been selected for presentation in the present disclosure is a conventional gasoline engine which is modified to stratified-charge operation by removal of its carburetor, intake manifold and spark plugs and replacement of these parts by an intake plenum chamber and a fuel injection-ignition system according to the invention. The intake ports of the engine cylinders open directly to the interior of the plenum chamber. The chamber interior, in turn, communicates directly to atmosphere through a suitable air filter. Accordingly, during intake, the engine cylinders draw in cool fuel free air directly from atmosphere at whatever the ambient temperature and humidity happen to be. The combination fuel injection-ignition units of the fuel injection-ignition system resemble, both in size and configuration, the conventional engine spark plugs which they replace and are threaded directly into the spark plug holes of the engine. Each of these injection-ignition units or plugs contains a fuel metering expansion chamber which communicates to a throttle controlled fuel delivery system. This fuel delivery system delivers fuel to the expansion chamber of each plug under a pressure related to throttle position. The expansion chamber in each plug communicates to its respective cylinder through a check valve mechanism and is bounded, in part, by a movable pressure wall exposed to cylinder pressure. The arrangement and construction of each plug is such that during the exhaust and intake strokes of its cylinder, the fuel metering expansion chamber in the plug receives, from the fuel delivery system, fuel under a pressure related to the current throttle position. This fuel pressure causes the chamber to expand, against spring action, to a volume related to the pressure and hence to the throttle setting. As a consequence, the chamber receives a charge of fuel whose weight is related to the current throttle setting. During the following compression stroke, increasing air pressure within the cylinder acts on the movable pressure wall of the expansion chamber to compress the chamber and actuate the check valve mechanism in such a way that the metered charge of fuel within the chamber is expelled from the chamber into the cylinder in response to the cylinder pressure attaining a predetermined pressure level. This pressure level is that which exists in the cylinder just prior to firing.

Also embodied in each fuel injection-ignition plug of the engine are a pair of spark plug electrodes. One of these electrodes is grounded. The other electrode is connected to the high tension terminal of the engine distributor by a high tension wire which replaces the standard ignition cable. This wire extends through a plastic fuel delivery tube through which fuel is supplied to the plug. The fuel delivery tube thus serves a dual purpose, namely, insulating the high tension wire and conducting fuel to the plug. The fuel flows through the plug in such a way as to continuously cool the plug and thereby insure long trouble-free operation. During firing, the high tension wire is energized to create a spark between the plug electrodes which ignites the fuel charge in the cylinder. Each plug is constructed and arranged to inject a fuel spray into the immediate vicinity of its spark gap region just prior to firing of the plug so as to provide within this region, at the instant of firing, a stratified fuel-air charge. According to a further feature of the invention, the fuel tank filler cap is equipped with a check valve to prevent the escape of fumes to atmosphere, and the engine crank case is vented to the interior of the intake plenum chamber. In this regard, it is significant to note that 20 percent of the unburned hydrocarbons emitted by the average automobile come from vapors escaping from the carburetor and fuel tank. By putting a check-valve in the filler cap, this invention converts the fuel supply system into a hermetically sealed one, and this source of pollution is completely eliminated. Normally the cap is provided with a vent hole, or a separate vent tube is provided to prevent pressure build-up in the gas tank. This feature of the invention is highly important for the reasons that not only are existing regulations satisfied, but more importantly it is done by eliminating parts rather than adding them. There are no valves to stick or clog and blow-by gases, in volumes that would make a conventional engine completely inoperative because of interference with correct mixture ratios, can be handled with impunity.

BRIEF DESCRIPTION OF THE DRAWINGS

FIG. 1 illustrates a stratified-charge engine according to the invention;

FIG. 2 diagrammatically illustrates the fuel delivery system of the engine;

FIG. 3 is an enlarged detail of the engine showing one of the fuel injection-ignition plugs;

FIG. 4 is an enlarged detail of a check valve embodied in the plug;

FIG. 5 is an enlarged section through a fuel injection-ignition plug; and

FIG. 6 is a fragmentary section through a modified plug.

DESCRIPTION OF THE PREFERRED EMBODIMENTS

Turning now to these drawings, there is illustrated a stratified-charge ignition combustion engine 10 according to the invention. In this instance, the engine is a standard V8 automobile engine which has been modified according to the invention for stratified charge operation. Accordingly, much of the engine structure is conventional and thus need not be described in detail. Suffice it to say that the engine has cylinders 12 containing pistons 14 with connecting rods 16 which are rotatably journalled at their lower ends on the engine crank shaft (not shown). At the top of each cylinder is a intake port 18 and an intake valve 20 for opening and closing the port. Each cylinder also has an exhaust port and an exhaust valve which are not visible in the drawings. The several intake and exhaust valves are operated, in the usual way, in timed relation to rotation of the engine crank shaft so that each intake valve opens during the intake stroke of its piston 14 and each exhaust valve opens during the exhaust stroke of its piston.

Also opening through the upper end of each cylinder 12 is a threaded bore 22 which, in the conventional engine, receives a spark plug. The engine 10 is equipped with the usual ignition system including a distributor 24 for firing the spark plugs near the ends of the compression strokes of their respective pistons 14. As noted earlier and explained in detail in the later description, the present stratified-charge engine does not use conventional spark plugs so that the latter do not appear in the drawings. Also replaced are the standard spark plug leads, as well as the carburetor and certain other engine parts. In this regard, it will be seen later that short standard leads are used between the distributor and fuel manifold. From there to the spark plugs extend nylon tubes which convey fuel to the plugs and also houses and insulates fine wires which conduct high voltage to the spark gaps of the plugs.

The structure of the stratified-charge engine 10 described to this point is conventional. It will be understood, therefore, that the engine pistons 14 reciprocate in their cylinders 12 in timed relation to the rotation of the engine crank shaft and that during such reciprocation, each piston undergoes successive intake, compression, power and exhaust strokes. The cylinder intake valves 20 and exhaust valves are operated in timed relation to the reciprocating motion of the pistons in a manner such that each intake valve opens during the intake stroke of its piston and each exhaust valve opens during the exhaust stroke of its piston. Both valves remain closed during the compression and power strokes of their piston.

In addition to the conventional engine structure described thus far, the present stratified-charge engine 10 embodies an air intake chamber or plenum 26, combination fuel injection and ignition units 28 hereinafter referred to as injection-ignition plugs or simply plugs, a fuel delivery system 30, and an ignition system 32. The intake plenum 26 is mounted on top of the engine 10 and contains an air intake chamber 34. This intake chamber communicates to the several intake ports 18 of the engine to permit unthrottled induction air flow from the chamber to the cylinders 12, as indicated by the arrows in the drawing. In the top of the intake plenum 26 is an air inlet 36 through which air enters the plenum chamber 34. The entering air passes through an air filter 38 removably mounted in any convenient way within the plenum inlet. It is now evident, therefore, that essentially unheated and unthrottled fuel free air enters each cylinder 12 virtually directly from atmosphere during each intake stroke of the cylinder piston 14.

It will be observed in the drawings that the fuel injection-ignition plugs 28 have the same general size and shape as conventional spark plugs and are threaded to fit within the engine spark plug holes 22. Each plug contains a cylinder pressure actuated fuel metering and injection pump 40 and spark ignition electrodes 42 and 44. Each plug receives and meters fuel from the fuel delivery system 30 and high tension ignition voltage from the ignition system 32. During operation of the engine, the air compression or pressure produced within each cylinder 12 during the compression stroke of its piston 14 actuates the fuel pump 40 within the corresponding plug 28 as the piston nears the end of its compression stroke. The pump, when thus actuated, injects a measured quantity of fuel directly into the spark ignition region of the plug electrodes 42, 44. The fuel pump 40 within each engine plug 28 is effectively controlled by the accelerator treadle, hereafter referred to in places as the accelerator, in such a way that the measured quantity of fuel injected by the pump into its respective cylinder during each compression stroke of its piston is proportional to the accelerator setting. The fuel injected into each cylinder 12 produces a concentrated layer or stratum of fuel within the spark ignition region of its plug 28. Immediately after fuel injection, and before this concentrated fuel stratum has an opportunity to disperse, the ignition system 32 of the engine delivers a high tension pulse to the center electrode 42 of the plug to create between the electrodes an arc or spark. This spark ignites the fuel to drive the corresponding piston 14 through its power stroke.

The fuel delivery system 30 comprises a fuel tank 46 with a filler pipe 48 closed by a cap 50. The fuel tank is conventional except that the filler cap 50 is equipped with a lightly spring loaded check valve 52 which opens to permit air passage into the tank but closes to block escape of gasoline fumes from the tank. A positive displacement fuel pump 54, driven by an electric motor 56, has an inlet connected to the fuel tank 46 through a fuel supply line 58. Leading from the pump outlet is a fuel delivery line 60 which connects to a pair of fuel manifolds 62 (only one shown). These manifolds are mounted on the engine 10 over the right and left-hand banks of cylinders 12, respectively. Individual cylinder fuel lines 64 extend from each fuel manifold to the adjacent engine plugs 28. For reasons which will appear presently, the fuel manifolds 62 and the cylinder fuel lines 64 are constructed of a suitable fuel and heat resistant plastic which possesses high dielectric strength. From this description, it is evident that the fuel system 30 delivers fuel under pressure from the fuel tank 46 to each fuel injection plug 28.

The pressure at which the fuel delivery system 30 delivers fuel to the engine plugs 28 is regulated in response to adjustment of the engine accelerator to regulate engine power output in a manner such that the fuel delivery pressure is constantly proportional to the accelerator setting. Regulation of the fuel pressure in this manner may be accomplished in various ways. In the particular embodiment of the invention which has been selected for illustration, the fuel pump 54 has a bypass valve 66 communicating the pump inlet and outlet. This by-pass valve is normally open to recirculate fuel from the pump outlet back to the pump inlet. The pump motor 56 is wired to the engine ignition switch 68 so that the motor is energized to drive the fuel pump 54, and thereby build up fuel pressure, instantly upon turning on the ignition switch. Operatively connecting the fuel pump by-pass valve 66 and the engine accelerator treadle 70 is a valve operating means 72. This valve operating means progressively closes the by-pass valve as the treadle is depressed. Closing of this valve increases the fuel pressure delivered to the engine plugs 28. The fuel delivery system 30 is so constructed and arranged that release of the accelerator treadle 70 to its idling position opens the by-pass valve 66 to an idle setting, wherein the fuel pump 54 delivers fuel to the engine plugs 28 at an idling pressure which is adjusted to effect optimum idling operation of the engine 10. Depression of the treadle progressively closes the by-pass valve to progressively increase the fuel pressure to the plugs in such a way that the fuel pressure is approximately proportional to the displacement of the treadle from its idling position.

A variety of valve operating means 72 may be employed to open and close the fuel pump by-pass valve 66 in response to movement of the accelerator treadle 70. The particular valve operating means illustrated comprises a simple mechanical link 74 which extends between the accelerator treadle and the by-pass valve. The by-pass valve has a valve actuator (not shown) connected to the adjacent end of the link 74. The other end of the link is connected to the accelerator treadle 70 in such a way that depression of the treadle operates the by-pass valve to closed position. Other valve operating means which may be employed are electrical and hydraulic mechanisms including a transducer actuated by the accelerator treadle for generating electromechanical or hydraulic signals related to treadle position and a valve actuator controlled by these signals for positioning the by-pass valve in response to the signals.

As already noted, the engine ignition system 32 comprises the usual ignition distributor 24. Extending from this distributor are high tension leads 78, one for each engine cylinder 12. The outer end of each lead 78 is fixed to an electrical connector by a standard socket. Each fuel manifold 62 has standard plug sockets for receiving the connectors on the high tension leads 78. Connected to each socket, within the respective fuel manifold 62, is a fine wire lead 84. This lead extends through the manifold to the fuel line 64 for the corresponding engine cylinder 12 and then through the fuel line to the respective cylinder fuel injection plug 28.

It is now evident that high tension voltage is conducted to the engine plugs 28 through the wire leads 84. At this point, it is significant to recall that the fuel manifolds 62 and the cylinder fuel lines 64 are constructed of a high dielectric strength plastic tubing, such as nylon tubing. This is necessary, of course, to prevent short-circuiting of the ignition system. The fuel delivery lines or tubes 64 thus serve the duel purpose of insulating the high tension wires 34 and conducting fuel to the plugs 28. The fuel flow through the tubes and plugs continuously cools the same to insure long trouble-free operation.

One of the engine fuel injection-ignition plugs 28 will now be described in detail by reference to FIGS. 5 and 6. The several plugs are essentially identical in construction so that a description of one plug will be sufficient for all. The plugs are calibrated to insure uniform metering of fuel to the various cylinders. Plug 28 has an outer tubular metal body 86 of generally the same size and shape as the body of a conventional spark plug. The upper end of the body is counterbored and internally threaded at 88. The lower end of the body is externally reduced in diameter and threaded at 90. Threaded in the upper end of the body is a gland nut 92. A generally tubular cap 94 extends through the gland nut and has an upper externally reduced internally threaded extension 96 projecting above the nut. Surrounding the lower end of the cap is an external flange 98 seating on an underlying soft metal washer 100. Washer 100 seats on an internal shoulder 102 within the plug body 86. The washer and cap flange 98 are firmly clamped between this shoulder and the lower end of the gland nut 92 to seal the plug body, the gland nut, add the cap to one another. An upper gland nut 104 is threaded into the upper end of the cap 94.

Fitted within the upper gland nut 104 is a plastic sleeve 106. The end of the cylinder fuel line 64 leading to the plug extends through and beyond the lower end of the sleeve 106 and into a socket 108 in the upper end of the cap 94. A resilient compression ring or seal 110 surrounds the lower end of the fuel line 64, just below the lower end of the plastic sleeve 106. The gland nut 104 is threaded into the cap 94 to compress the ring 110 between the lower end of the sleeve 106 and a conical seating face 112 about the upper end of the fuel line socket 108. The fuel line 64 is thereby firmly joined and sealed to the plug 28.

Press fitted into the upper end of the central cavity 114 within the cap 94 is a disc 116. This disc has an apertured central portion or plate 118 bounded by an upstanding flange 120. Flange 120 seats against the upper end wall 122 of the cavity 114 to provide a clearance space or chamber 124 between the wall and disc. This chamber opens upwardly through the cap socket 108 to the fuel line 64 and downwardly to the region of the cavity 114 below the disc 116 through ports 125 in the disc.

Fixed at its upper end within a central opening in the disc 116 and depending below the disc is a sleeve 126. This sleeve has a lower flange 128 located some distance below the sealing washer 100. A plastic reinforcing sleeve 130 is press fitted into the sleeve 126 to a position wherein a flange 132 on the lower end of the inner sleeve abuts the flange 128 on the outer sleeve. Surrounding the outer sleeve 126, between its lower flange 128 and the upper disc 116 is a check valve sleeve 134. This valve sleeve has a length slightly less than the axial spacing between the disc 116 and the sleeve flange 128. The internal diameter of the valve sleeve is greater than the external diameter of the sleeve 126 to provide an annular passage 136 between these sleeves. Valve sleeve 134 has a beveled upper end providing a relatively sharp seating edge 138. The valve sleeve has a lower seating edge 140 which is axially slotted at intervals to provide radial ports 142. Valve sleeve 134 is movable axially between an upper limiting position wherein the upper beveled edge 138 of the valve contacts the disc 116 and a lower position wherein the lower slotted edge 140 of the valve contacts the sleeve flange 128. As will appear presently, the check valve, when in its lower limiting position, permits fuel flow from the fuel cavity 114, externally of the valve, into the annular fuel passage 136 through the valve. When in its upper limiting position, the valve blocks fuel flow from the cavity through the passage. For this reason, the lower position of the valve is hereinafter referred to as its open position and the upper position of the valve is referred to as its closed position.

The interior of the plug body 86 below the sealing washer 100 provides a cylinder 144 containing a plunger 146. Plunger 146 has a radially enlarged body portion 148 within the cylinder 144. Extending centrally upward from this plunger body portion is a tubular stem 150. This stem fits slidably over the check valve 134. Fixed in a groove in the upper end of the plunger stem 150 is a washer 152 which provides a seating shoulder for one end of a compression coil spring 154. The other end of spring 154 seats against the sealing washer 100. It is now evident, therefore, that the spring 154 urges the plunger 146 upwardly in the plug body 86.

The body 148 of the plunger 146 is sealed to the wall of the cylinder 144 by sealing means 156. In this instance, the sealing means comprises a resilient piston ring 158 which surrounds and contacts a conically tapered surface portion 160 of the plunger body 148. The central opening through the piston ring is conically tapered to complement the conical surface portion 160. From this description and the drawings, it will be understood that downward relative movement of the piston ring 158 over the conically tapered plunger body 148 causes outward radial expansion of the piston ring against the wall of the plug body cylinder 144 to seal the plunger 146 to the cylinder.

The piston ring 158 may be constructed of any suitable yieldable material which is chemically inert, exhibits high heat resistance, and has a relatively low coefficient of friction against the wall of the plug body cylinder 144. One material which is particularly suited for this purpose is Tetrafluoro-Polyethylene, commonly known by its tradename Teflon. Teflon has a very high coefficient of thermal expansion (10 times that of steel). To offset this, its modulus of elasticity is quite low. The high heat expansion coefficient makes it impossible to install a simple Teflon piston ring into a metal bore so that both a free sliding fit and an effective fluid seal are obtained simultaneously. As will appear from the ensuing description, the illustrated conically tapered piston ring and plunger configuration resolves this problem. Suffice it to say at this point that the piston ring 158 provides an effective sliding fluid-tight seal between the plunger body 148 and the wall of the plug body cylinder 144.

The inner plastic sleeve 130 contains a fixed plastic tube 162. Fixed within the tube is a stranded high tension lead 164. The upper ends of the tube 162 and lead 164 extend upwardly into the cylinder fuel line 64. The upper end of the high tension lead 164 is exposed above the upper end of the tube 162 and is fanned to make electrical contact with a surrounding coil 166 of the high tension lead 84 within the fuel line. The lower ends of the tube 162 and lead 164 extend downwardly through a central opening 168 in a tubular insulator 170 fixed to the lower end of the plunger body 148. In this case, the insulator is a ceramic insulator having a flanged upper end which seats within a socket in the lower end of the plunger body. The rim of the body about the socket is spun over the insulator flange at 172 to join the body and insulator into a unitary structure. Fixed within an upper counterbore in the insulator 170 is a plastic insulator plug 174. The upper end of this plug fits within the lower end of the central opening through the plunger 146. Insulator plug 174 receives and surrounds the lower extending ends of the plastic tube 162 and high tension lead 164.

Fixed within the lower end of the insulator opening 168 is a metallic ferrule 176. The upper end of this ferrule fits about the lower end of the insulator plug 174 and is externally flanged to seat upon the internal shoulder about the wall of the insulator opening 168. Ferrule 176 is thereby firmly locked to the ceramic insulator 170. If desired, the ferrule may be also adhesively bonded to the insulator. Ferrule 176 is internally threaded to receive an injector valve body 178. This valve body has a threaded tubular stem 180 which fits within the ferrule and a lower laterally enlarged head 182.

The central electrode 42 of the fuel injection-ignition plug 28 comprises a cup of heat and erosion resistant metal having a central disc 184 centrally apertured to receive the threaded stem 180 of the injector valve body 178. About the disc is a depending outwardly sloping flange or lip 186. Injector valve body 178 is threaded into the ferrule 176 to firmly clamp the electrode disc 184 between the body flange 182 and the lower end of the ferrule. The outer plug electrode 44 is provided by a heat and erosion resistant ring which is press fitted into the lower end of the plug body 86.

Contained within the injector valve body 178 is a coil spring 190. The upper coil of this spring is fixed to the upper end of the body stem 180 in any convenient way. Threaded in the lower end of the spring is an injector valve 192, proper. Valve 192 extends downwardly through a central fuel injection port 193 in the lower flanged head of the valve body 178 and has an enlarged valve head 194 at its lower end. Valve spring 190 is stressed to urge the valve 192 upwardly to engage its head 194 with a valve seat 196 about the fuel injection port 193. The force required to unseat the injector valve 192 is adjustable by threading the valve into and out of the valve spring 190. The lower end of the high tension lead 164 extends into the valve spring 190 and is fanned at its lower end to contact the spring coils. During operation of the stratified-charge engine, each fuel injection-ignition plug 28 receives fuel from the fuel delivery system 30 through the corresponding cylinder fuel line 64 at a pressure related to the position of the accelerator treadle 70. More particularly, this delivery fuel pressure is proportional to the displacement of the accelerator treadle from its idle position. The fuel delivered to each plug enters its upper cavity or chamber 114 and passes downwardly through the central opening in the sealing washer 100 of the plug to exert a downward pressure on its plunger piston ring 158. During the portion of each cycle in which the corresponding cylinder pressure is at or near atmospheric pressure (which occurs throughout approximately 400° of the total 720° crank shaft rotation during each cycle), this fuel pressure urges or extends the entire plunger assembly 146 downwardly in the plug body 86 against the upward thrust of the plunger spring 154. The plunger assumes a position wherein the fuel pressure and spring force on the plunger are balanced. The fuel pressure also forces the piston ring 158 downwardly over the conical plunger shoulder 160, thereby expanding the piston ring radially out into fluid sealing contact with the wall of the plunger cylinder 144.

The plunger check valve sleeve 134 is dragged downwardly with the plunger 146 because of the frictional drag between the contacting surfaces of the plunger and valve sleeve. The valve sleeve is thereby moved downwardly from its upper closed position of seating contact with the plug disc 116 to its lower open position of seating contact with the flange 128 on the outer plastic sleeve 126. Fuel is then permitted to flow from the outer chamber 114 of the plug 28, the annular check valve passage 136, the radial slots or ports 142 in the check valves sleeve 134, into the interior chamber 195 of the plunger 146. The injector valve 192 is retained closed at this time by the valve spring 190.

It will now be understood that at the bottom of each intake stroke of an engine piston 14, the plunger 146 of the corresponding fuel injection-ignition plug 28 occupies a position in the plug body 86 wherein the opposing fuel pressure and spring force on the plunger are balanced. In this balanced position, the interior chamber 195 of the plunger contains a charge of fuel proportional to the fuel pressure. Since the fuel pressure, in turn, is proportional to the displacement of the accelerator treadle from its idle position, the plunger fuel charge is also proportional to treadle displacement. During the following compression stroke of the engine piston 14, the engine cylinder pressure increases and urges the plunger 146 of the plug 28 upwardly in the plug body 86. This action initially displaces fuel from the interior chamber 195 of the plunger into the outer plug chamber 114 and from the latter chamber back into the cylinder fuel line 64. However, the check valve sleeve 134 of the plug 28 is retracted upwardly with the plunger, and shortly after commencement of the upward plunger stroke, returns to its closed position of contact with the plug disc 116 to block further fuel displacement from the interior plunger chamber 195.

Continued upward movement of the engine piston 14 through its compression stroke following closing of the plug check valve 134 increases the compression pressure within the engine cylinder 12 and, thereby, the upward pressure force on the plug plunger 146. This action, in turn, increases the pressure of the fuel trapped within the interior chamber 195 of the plunger and, thereby, the force exerted by the fuel on the injector valve 192 tending to open the latter valve against the action of its closing spring 190. Eventually, this opening force on the injector valve 192 overcomes the closing force of the valve spring 190, the valve opens, and the contents of chamber 195 are discharged into the engine cylinder.

The closing force exerted on the injector valve 192 by its valve spring 190 is adjusted by threading the injector valve into or out of the spring. According to the present invention, this spring closing force is adjusted or calibrated so that the injector valve opens to effect fuel injection into the engine cylinder 12 just prior to delivery of a high tension ignition voltage to the electrodes 42, 44 of the plug 28 by the engine distributor 24. This ignition voltage is applied to the center electrode 42 of the plug through the corresponding high tension leads 84, 164. The outer plug electrode 44 is grounded to the engine block through the metallic plug body 86. Accordingly, the high tension voltage applied to the center electrode 42 produces an ignition spark between this electrode and the outer electrode 44. The ignition spark ignites the fuel within the engine cylinder 12 to drive the corresponding piston 14 through its following power stroke. Thereafter, the entire process is repeated during the next cycle of the cylinder.

As shown in the drawings, the fuel charge injected into each engine cylinder 12 during each compression stroke of its piston 14 is jetted directly into the spark region of the corresponding fuel injection-ignition plug 28. This produces a concentrated fuel-rich layer or stratum within the spark region. Such fuel injection is timed to occur just prior to spark ignition of the plug by proper adjustment or calibration of its injector valve spring 90 in the manner explained above, such that the fuel-rich stratum has no opportunity to disperse throughout the engine cylinder 12 before spark ignition occurs. In a typical engine according to the invention, the injector valve 192 of each plug 28 is adjusted so that fuel injection begins in the range between 90° to 45° before top dead center of the corresponding engine piston 14. The latter figure is somewhat earlier than the earliest spark timing that occurs in normal engine operation. Injection, depending on quantity of fuel metered by the plug, extends over an appreciable period of time and may occur over a period exceeding 45°. Accordingly, injection may not be completed until after top dead center. Under these conditions, the fuel is ignited by the spark to drive the corresponding engine cylinder 14 through its power stroke and achieve the various advantages discussed earlier.

At this point, it is significant to note that the fuel entering each fuel injection-ignition plug 28 during the fuel intake portion of each cycle effectively divides between the outer plug chamber 114 and the interior chamber 195 of the plug plunger 146. In a typical plug according to the invention, the ratio of these fuel chambers is 5 to 1. Thus, during that portion of each engine cylinder cycle in which fuel enters the corresponding fuel injection-ignition pump 28, the outer plug chamber 114 receives five times as much fuel as the inner plunger chamber 195. During subsequent return of the plug plunger 146 into the plug body 86 under cylinder compression pressure, the fuel in the outer plug chamber 114 is displaced back into the fuel delivery system 30 to aid in feeding fuel to other plugs which may then be receiving fuel. This fuel displacement involves a differential piston action whereby engine compression of 200 p.s.i. say, acting on the area of the plunger 146, which is typically on the order of six times as great as the area of the injector pump piston, can build up a fuel injection pressure as high as 1,200 p.s.i. The actual fuel injection pressure is determined by the setting of the discharge valve and, consequently, fuel injection begins before full compression pressure is reached at top dead center.

The fuel delivery system thus handles on the order of six times as much fuel as is actually injected. The excess fuel simply shuttles back and forth between cylinders and does not represent an additional load on the electric motor driven fuel supply pump. This excess shuttling fuel flow through the system necessitates the use of somewhat larger fuel lines to the plugs than would otherwise be required. However, such larger fuel lines constitute a small penalty to pay for the ability to make a relatively low compression pressure inject fuel at a pressure greatly in excess of the generating pressure.

The overall operation of the present stratified-charge engine 10 is believed to be obvious from the preceding description. Thus, during engine operation, fuel is delivered to each fuel-injection-ignition plug 28 under a pressure related to the current setting of the accelerator treadle 70. During that portion of each cycle of each engine cylinder 12 in which the cylinder pressure is at or near atmospheric pressure, the fuel enters the corresponding cylinder plug 28 and extends its plunger 146 downwardly against the action of the plunger spring 154 until the fuel pressure and spring force on the plunger are balanced. At this point, the interior chamber 195 of the plunger contains a metered charge of fuel proportional to the displacement of the accelerator treadle 70 from its idle position. This metered fuel charge is injected directly into the cylinder spark region during the following compression stroke of the corresponding engine piston 14 just prior to spark ignition and for a short interval after. Accordingly, a fuel-rich stratum always exists within the spark region at the instant of ignition. The spark produced between the cylinder plug electrodes 42, 44 during ignition ignites the fuel in the fuel-rich stratum to drive the engine cylinder 14 through its following power stroke.

According to an important feature of the invention, the engine crank case 197 communicates to the plenum chamber 34 through a conduit 198. Accordingly, blow-by gases which enter the crank case from the cylinders, and fumes evolved within the crank case are returned to the cylinders, to eliminate atmospheric pollution by such gases and fumes, without the need of additional equipment.

At this point, attention is again directed to the piston ring 158 on the injector plug plunger 146. This piston ring configuration constitutes an important feature of the invention. In this regard, it will be recalled that fuel pressure acting on the piston ring 158 forces the latter downwardly over the conical surface 160 on the plunger 146 to expand the ring outwardly into sealing contact with the wall of the plunger cylinder 144 This type of sealing action permits the piston ring to be constructed of a material, such as a fluorocarbon plastic which has a relatively low coefficient of sliding friction against the wall of the plunger cylinder 144 and a high coefficient of thermal expansion. Such a high thermal expansion coefficient precludes the use of a simple fluorocarbon plastic ring seating closely within the plunger cylinder 144 for the reason that such a ring would either exhibit excessive frictional drag at high temperature or excessive fuel leakage at low temperature. The illustrated internally tapered fluorocarbon plastic piston ring is designed to be effectively urged by fuel pressure into sealing contact with the wall of the plunger cylinder 44, whereby the piston ring may be dimensioned to move freely within the cylinder at high temperature and yet provide an effective fluid sealing action at low temperature.

It should be noted that when starting from cold, if the fluorocarbon plastic ring has contracted from the wall of cylinder 144, then, on the first upward stroke of plunger 146, the first contact is made between ring 158 and soft seal ring 102. Compression pressure then forces ring 158 to slide relative to taper 160 and expand ring 158 into intimate contact with the wall of cylinder 144. From then on fuel pressure and compression pressure in turn insure that a leak-proof seal is maintained.

FIG. 6 illustrates a slightly modified fuel injection-ignition plug 200 according to the invention. This modified plug is essentially identical to the plug 28 described above except that the piston ring 158 and conical piston ring expanding surface 160 on the plunger 146 of the latter plug are replaced, in the plug 200, by an annular bellows 202. This bellows surrounds the plunger 204 of the plug and has one end sealed to the seal washer 100 of the plug. The opposite end of the bellows is sealed to a flat annular shoulder 208 on the plunger 204.

It will now be understood that in each disclosed embodiment of the invention, the fuel injection pump, i.e., item 40 (FIG. 6) in each plug 28, 200 is effectively a positive displacement pump, wherein the plunger 146 is a movable pressure wall which is urged in one direction by both cylinder compression pressure and by the action of the plunger spring 154 and in the opposite direction by fuel pressure. This pressure wall and the plug body define an expansible pumping chamber 195 into which fuel flows during the fuel intake portion of each cycle until the fuel pressure in the chamber and the spring force on the pressure wall are balanced. At this point, the pumping chamber contains a volume of fuel proportional to the fuel pressure. During the following compression stroke of the engine cylinder 14, cylinder pressure acting on the movable pressure wall urges the latter in a direction to expel the measured volume of fuel from the pump chamber into the cylinder just prior to spark ignition.

What is claimed as new in support of Letters Patent is:

1. A fuel injection-ignition plug for a stratified-charge engine comprising:
a tubular body having inner and outer ends;
a pair of spaced electrodes at the inner end of said body defining an intervening spark gap;
a high tension conductor accessible at the outer end of said body and connected to one electrode for conducting high tension ignition voltage to the latter electrode;
fuel injection means within said plug having a fuel inlet at the outer end of said body and a fuel injection port at the inner end of said body for injecting fuel into the immediate vicinity of said spark gap;
said fuel injection means comprises a fuel injection pump within said body;
said plug is adapted to be installed in said engine in a manner such that said electrodes are positioned within an engine cylinder and said fuel injection port is exposed to the pressure within said cylinder;
said pump is a positive displacement pump including an expansible pumping chamber communicating with said fuel inlet and fuel injection port and bounded in part by a movable pressure wall which is urged in one direction by fuel pressure within said chamber to enlarge said chamber and in the opposite direction by compression pressure within said cylinder to expel fuel from said chamber into said cylinder, a spring for urging said pressure wall in said latter direction, a check valve between said chamber and fuel inlet which opens to admit fuel from said inlet to said chamber and to block reverse fuel flow, and a normally closed spring loaded fuel injector valve for blocking fuel flow through said injection port into said cylinder until the fuel pressure within said pumping chamber attains a preset pressure level;
said movable pressure wall comprises a plunger movable longitudinally within said plug body;
said plunger is hollow and contains said pumping chamber and the inner end of said plunger is exposed at the inner end of said body, whereby cylinder pressure at the inner end of said body urges said plunger outwardly relative to said body;
said electrodes comprise annular electrodes mounted on the inner end of said body and the inner end of said plunger, respectively;
said check valve comprises a valve sleeve parallel to the longitudinal axis of said plunger and slidably engaging said plunger, whereby said valve sleeve tends to move longitudinally with said plunger by virtue of the frictional drive between said plunger and valve sleeve, and said valve sleeve being movable outwardly with said plunger relative to said body to the closed position and inwardly with said plunger relative to said body to the opened position; and
said fuel injection port and injector valve are carried by the inner end of said plunger.

2. A fuel injection-ignition plug according to claim 1 including:
a bellows coaxially surrounding said plunger between the latter and said body and sealed at one end to said plunger and at the opposite end to said body to seal the plunger and body against fluid leakage therebetween.

3. A fuel injection-ignition plug according to claim 1 including:
an elastic piston ring coaxially surrounding said plunger between the latter and said body, and
said plunger having a conically tapered shoulder and said piston ring being internally conically tapered to fit over said plunger shoulder and having an axially presented pressure face exposed to fuel pressure within said plug in a manner such that said fuel pressure urges said piston ring over said conical plunger shoulder to expand said ring radially outward into sealing contact with said body.

4. A fuel injection-ignition plug comprising:
a cylindrical tubular body having a first end and a second end;
a pair of spaced apart electrodes located at said first and defining an intervening spark gap, said electrodes being annular in cross sectional configuration;
fuel injection means within said plug having a fuel injection port located at said first end for injecting fuel into the immediate vicinity of said spark gap, said port being located substantially in an axial relationship with respect to said electrodes;
said fuel injection means comprises a fuel injection pump within said body, said pump is a positive displacement pump including an expansible pumping chamber communicating with said fuel inlet and fuel injection port and bounded in part by a movable pressure wall which is urged in one direction by fuel pressure within said chamber to enlarge said chamber and in the opposite direction by compression pressure within said cylinder to expel fuel from said chamber into said cylinder, a coil spring connected between said movable pressure wall and said body for urging said pressure wall in said latter direction, a check valve between said chamber and fuel inlet which opens to admit fuel from said inlet to said chamber and to block reverse fuel flow, and a normally closed spring loaded fuel injector valve for blocking fuel flow through said injection port into said cylinder until the fuel pressure within said pumping chamber attains a preset pressure level thereby effecting opening of said injector valve;
a single fuel inlet located at the second end, said inlet being substantially axially located with respect to said tubular body; and
a first line being employed to supply fuel to said fuel inlet, an ignition wire connected to one of said electrodes, said wire being conducted through said fuel line.

5. A plug as defined in claim 4 wherein:
adjustment means connected to said injection valve to vary the pressure force setting required to effect opening of said injector valve.

6. A plug as defined in claim 5 wherein:
said adjustment means includes a spring.

7. A fuel injection-ignition plug according to claim 4 wherein:
said movable pressure wall comprises a plunger movable longitudinally within said plug body.

8. A fuel injection-ignition plug comprising:
a cylindrical tubular body having a first end and a second end;
a pair of spaced apart electrodes located at said first end defining an intervening spark gap, said electrodes being annular in cross sectional configuration;
fuel injection means within said plug having a fuel injection port located at said first end for injecting fuel into the immediate vicinity of said spark gap, said port being located substantially in an axial relationship with respect to said electrodes;
said fuel injection means comprises a fuel injection pump within said body, said pump is a positive displacement pump including an expansible pumping chamber communicating with said fuel inlet and fuel injection port and bounded in part by a movable pressure wall which is urged in one direction by fuel pressure within said chamber to enlarge said chamber and in the opposite direction by compression pressure within said cylinder to expel fuel from said chamber into said cylinder, a spring for urging said pressure wall in said latter direction, a check valve between said chamber and fuel inlet which opens to admit fuel from said inlet to said chamber and to block reverse fuel flow, and a normally closed spring loaded fuel injector valve for blocking fuel flow through said injection port into said cylinder until the fuel pressure within said pumping chamber attains a preset pressure level thereby effecting opening of said injector valve;

said movable pressure wall comprises a plunger movable longitudinally within said plug body; and said check valve comprises a valve sleeve parallel to the longitudinal axis of said plunger and slidably engaging said plunger, whereby said valve sleeve tends to move longitudinally with said plunger by virtue of the frictional drive between said plunger and valve sleeve, said valve sleeve being movable with said plunger to the closed position and relative to said body, said valve sleeve being movable with said plunger to the open position relative to said body.

9. A fuel injection-ignition plug according to claim 8 including:

a bellows coaxially surrounding said plunger between the latter and said body and sealed at one end to said plunger and at the opposite end to said body to seal the plunger and body against fluid leakage therebetween.

10. A fuel injection-ignition plug according to claim 8 including:

an elastic piston ring coaxially surrounding said plunger between the latter and said body; and said plunger having a conically tapered shoulder and said piston ring being internally conically tapered to fit over said plunger shoulder and having an axially presented pressure face exposed to fuel pressure within said plug in a manner such that said fuel pressure urger said piston ring over said conical plunger shoulder to expand said ring radially outward into sealing contact with said body.

* * * * *

UNITED STATES PATENT OFFICE
CERTIFICATE OF CORRECTION

Patent No. 3,665,902    Dated May 30, 1972

Inventor(s) John J. Bloomfield

It is certified that error appears in the above-identified patent and that said Letters Patent are hereby corrected as shown below:

In Title, change "Stratfield" to ---Stratified---.

Column 1, line 1, change "Stratfield to ---Stratified---.

Column 7, line 56, change "duel" to ---dual---.

Column 8, line 3, change "add" to ---and---.

Signed and sealed this 20th day of March 1973.

(SEAL)
Attest:

EDWARD M. FLETCHER, JR.          ROBERT GOTTSCHALK
Attesting Officer                Commissioner of Patents